US007979193B2

(12) United States Patent
Harbert

(10) Patent No.: US 7,979,193 B2
(45) Date of Patent: Jul. 12, 2011

(54) EVEN FIRE 90°V12 IC ENGINES, FUELING AND FIRING SEQUENCE CONTROLLERS, AND METHODS OF OPERATION BY PS/P TECHNOLOGY AND IFR COMPENSATION BY FUEL FEED CONTROL

(76) Inventor: Richard H. Harbert, Mukilteo, WA (US)

( * ) Notice: Subject to any disclaimer, the term of this patent is extended or adjusted under 35 U.S.C. 154(b) by 475 days.

(21) Appl. No.: 12/251,828

(22) Filed: Oct. 15, 2008

(65) Prior Publication Data

US 2009/0099755 A1 Apr. 16, 2009

Related U.S. Application Data

(60) Provisional application No. 60/980,110, filed on Oct. 15, 2007.

(51) Int. Cl.
*F02B 75/22* (2006.01)
*G06F 17/00* (2006.01)

(52) U.S. Cl. ........................................ 701/103; 123/54.8

(58) Field of Classification Search ................. 123/52.2, 123/54.4, 54.7, 54.8, 192.1, 192.2, 198 F, 123/406.47; 701/103, 104, 105
See application file for complete search history.

(56) References Cited

U.S. PATENT DOCUMENTS 3,694,895 A 10/1972 Werner
3,978,828 A * 9/1976 Weber .......................... 123/54.7
5,003,953 A 4/1991 Weglarz et al.
5,056,472 A * 10/1991 Kurokawa et al. ........... 123/54.8
6,279,519 B1 * 8/2001 Nagel et al. .................. 123/55.5
6,360,713 B1 * 3/2002 Kolmanovsky et al. ...... 123/295
6,823,835 B2 * 11/2004 Dunsworth et al. .......... 123/305
6,823,837 B2 * 11/2004 Nakamura .................... 123/335
6,990,960 B2 * 1/2006 Lewis et al. ................... 123/487
7,124,743 B2 * 10/2006 Gonzales et al. ............. 123/491
7,134,407 B1 * 11/2006 Nelson ......................... 123/54.4
7,181,333 B2 * 2/2007 Sheikh et al. ................. 701/105
7,277,789 B1 * 10/2007 Gibson et al. ................. 701/104
7,367,180 B2 5/2008 Surnilla et al.
2002/0195087 A1 12/2002 Dunsworth et al.
2010/0288037 A1 * 11/2010 Gibson et al. .............. 73/114.79
2011/0048382 A1 * 3/2011 Pattakos et al. ............. 123/48 B

OTHER PUBLICATIONS

General Motors Engine Control Systems, V 2.0 Second Printing, Target Training Systems, Inc., (993) p. 398.

(Continued)

*Primary Examiner* — Mahmoud Gimie
*Assistant Examiner* — David Hamaoui
(74) *Attorney, Agent, or Firm* — Jacques M. Dulin, Esq.; Innovation Law Group, Ltd

(57) ABSTRACT

90°V12 reciprocating, EFI/DIS fueled/fired, IC engines having a PCM controller operating the engine in an Even Fire ignition mode, in a novel fueling and firing sequence called Progressive Single/Pair (PS/P) firing, wherein the cylinders of each of a set of four pairs of internal cylinders are simultaneously fueled and fired in parallel to produce a pump-gas fueled power curve greatly improved over V6 and V8 engines. The inherent imbalance-induced transitory vibration in IFR RPM is compensated-for by fuel feed control, namely, leaning one cylinder of each pair-fired cylinder pair. The inventive 90°V12 retro-fits into the engine compartment of conventional vehicles and can use any liquid or gaseous fuel. The inventive 90°V12 has use in the exemplary fields of: automotive engines; heavy military and industrial equipment and vehicle engines; marine engines; aircraft engines; and stationary power sources; in both 2-cycle and 4-cycle modes, and in normally aspirated, super-charged and turbo-charged configurations.

20 Claims, 4 Drawing Sheets

OTHER PUBLICATIONS http://www.google.com/search?hl=en&q=V12+Engines&btnG=Google+Search.
http://www.falconerengines.com/.
http://en.wikipedia.org/wiki/Turbocharged__Direct__Injection.
http://en.wikipedia.org/wiki/Electronic__fuel__injection.
http://www.hptuners.com/products/vcmsuite.php.
http://static/howstuffworks.com/gif/dodge-viper-16.jpg.
http://www.ebscohost.com/thisTopic.php?marketID=6&topicID=35; ARRC, Auto Repair Reference Center (Chilton Information Manuals) 2002, Chevrolet, Suburban 1500, V8 5.3t FI Gas.

* cited by examiner

EVEN FIRE 90°V12 IC ENGINES, FUELING AND FIRING SEQUENCE CONTROLLERS, AND METHODS OF OPERATION BY PS/P TECHNOLOGY AND IFR COMPENSATION BY FUEL FEED CONTROL

CROSS-REFERENCE TO RELATED APPLICATION

This is the Regular U.S. Application corresponding to U.S. Provisional Application Ser. No. 60/980,110 filed by the same inventor under the title EVEN FIRE 90°V12 IC ENGINES, FIRING SEQUENCE CONTROLLERS AND METHODS OF OPERATION BY PS/P FIRING SEQUENCING AND FUEL FEED CONTROL IN SELECTED RPM RANGES on Oct. 15, 2007, the benefit of the filing date thereof being claimed under 35 US Code §§119, 120, ff, and the entire text and drawings of which are hereby incorporated by reference.

FIELD

The invention relates to internal combustion (IC) engines, and more particularly to Even Fire 90°V12 engines operable on any liquid or gaseous fuel, in which the angle between the banks of cylinders is 90°, yet the inherent imbalance-induced transitory vibration in some RPM ranges of 90°V-block engines is compensated-for by effective displacement reduction, via fuel feed control, in selected RPM ranges. The inventive 90°V12 engine is PCM-controlled to operate in an Even Fire ignition mode in a novel fueling and firing sequence called Progressive Single/Pair (PS/P) firing to produce a power curve greatly improved over V6 and V8 engines at higher rpm, thus providing greater horsepower, greater torque, improved fuel efficiency and longer engine life. IFR is compensated-for via fuel feed control to selected cylinders of the PS/P pairs. At the same time, the inventive 90°V12 fits in the engine compartment of conventional autos, trucks, SUVs, motor homes, and cross-over type vehicles. The inventive 90°V12 has use in the exemplary fields of: automotive engines; heavy military and industrial equipment and vehicle engines; marine engines, aircraft engines, and stationary power sources, in both 2-cycle and 4-cycle modes, and in normally aspirated, super-charged and turbo-charged configurations that can run on pump gas, diesel, bio-fuels, propane, syn-gas or natural gas.

BACKGROUND

Although V12 engines reached their height of use between World War 1 and II in aircraft, they were displaced quickly by the advent of turbo-prop and jet engines. There have been inherent problems for use in vehicles, finding only occasional use in exotic cars, due to their size, complexity and cost. Improvements in combustion chamber design and piston forms enabled lighter, shorter V8 engines to surpass the V12s, starting in the 1930s, and they essentially disappeared after WWII, except for a few top-of-the-line luxury and sports cars, such as those of Rolls-Royce, Jaguar, Mercedes-Benz, BMW, Ferrari, Aston Martin and Lamborghini. V12s were common in Formula One race cars through about 1980, but the Ford Cosworth V8s proved to have better power-to-weight ratios and less fuel consumption, so they became more successful, in spite of being less powerful and having less endurance than the best V12s of that era.

V12 is a common configuration for large diesel engines used in trucks and marine use. In gasoline and diesel-fueled engines, V12 is a common configuration for tank and other armored fighting vehicles.

The firing of cylinders in a 4-stroke engine fall into two main classes: Even Fire and Odd Fire:

- Even Fire is when the cylinder fires at or near Top Dead Center (TDC) of the 3rd stroke, so that the firing, including lead time, produces an efficient and rapidly propagating flame front throughout the cylinder in respect of the fuel being burned. The result is development of combustion peak pressures at or very near TDC, thus providing the maximum power stroke travel of the piston.
- Odd Fire is when the cylinder firing is delayed well into the 3rd stroke, for example 15-35° after TDC. Depending on the number of cylinders, Odd Fire is required in some V-type engines as a result of the angle between the cylinder banks and the geometry of the firing sequence, that is, where the several pistons are respectively positioned in the 720 degrees of rotation to complete the 4 cycles. Other considerations for the delay include balance and vibration induced by the rotational dynamics of the engine during operation. Of course, Odd Fire reduces the efficiency of an engine. A 30° or so delay robs that cylinder of roughly half its power, so that in an engine having some of the cylinders set for delay to reduce or eliminate the induced vibration, the maximum theoretical power output cannot be reached. Delay can also induce premature ignition knock. The power-to-weight ratio drops, so other cylinder configuration engines may make more sense to use.

V8s are designed with a 90° V to ensure that a cylinder firing occurs every 90° so that all 8 cylinders have fired in two complete crankshaft revolutions, that is, in the 720° of crankshaft rotation in a 4-cycle engine.

The angle between cylinders has a huge effect on engine compartment layout and center of gravity. Briefly, the wider the angle, the lower the CG. Engine compartment volume requirements directly affect the body configurations, especially in front-engine vehicles, which is critical for good aerodynamics, a major contributor to good fuel efficiency.

A conventional Even Fire V12 requires a 60° angle between the two banks of 6 cylinders (60°V-angle). If a V12 has a different V-angle in the block, such as a 90°V, then that configuration requires an Odd Fire timing condition, where some or all of the cylinders do not have combustion peak pressures at or very near top dead center (TDC). Thus, Odd Fire V12s typically do not produce full theoretical power, combustion is incomplete, and the power-to-weight ratio is reduced. In addition, the 90°V configuration produces vibrations in a 12 cylinder engine that are not present in an 8 cylinder engine, again due to the rotational dynamics described above. To resolve the vibration problem, the angle is narrowed to 60°.

Thus, V12s have not gained acceptance because they are stuck between two limiting choices: 1) To use a 90°V, you must have Odd Fire with the result of loss of power and performance on the one hand, and if you try Even Fire, you get rough, induced vibration operation; 2) On the other hand if you use a 60°V, you raise CG, increase aerodynamic drag, and engines are more costly to make, not fitting within the manufacturing processes for V8s.

Accordingly, there is an unmet need in the art to provide an improved V12 engine that more nearly achieves the potential advantages of that size and type of engine: namely, greater power-to-weight ratio, lower CG than a 60°V-angle between banks, improved engine compartment layout, adaptability to all types of fuels and all fields of engine use, smooth operation through the RPM curve, better RPM curve shift points, greater torque, greater overall power, slower running for improved engine life, lower cost per cubic inch displacement, and ease of production for engine constructors set up for conventional V8-type engine production.

THE INVENTION

Summary, Including Objects and Advantages

The invention is directed to and covers apparatus (Internal Combustion engines, including all operational systems therefor), computerized controllers for operation of the engines (including firing sequencing and electronic fuel injection control) and methods of control of IC engine operation. Together, these aspects of the invention are collectively referred to herein as "the PS/P technology" and/or "the inventive system". More particularly, the inventive system is directed to and covers apparatus and methods relating to Even Fire 90°V12 IC engines, novel cylinder fueling and firing sequences, engine vibration control (IFR Compensation) through effective powered displacement reduction by fuel control, Electronic Fuel Injection (EFI) and Distributorless Ignition Systems (DIS), and Dynamic Fuel Balancing.

With respect to computerized control modules, there are a wide range of acronyms in use in the industry, including Vehicle Control Modules (VCM) for computer monitoring and/or control of all vehicle systems, and sub-sets or sub-modules thereof or therein relating to the powertrain which is the focus of this invention. Such Powertrain Control Modules (PCMs) are also termed Engine Control Units (ECUs), Engine Control Modules, or ECMs, and all of them contain programmable microprocessors having engine operating algorithms and a variety of databases from which to draw, inter alia, data on fueling and firing parameters, depending on various inputs from sensors distributed in the engine and elsewhere in the vehicle. In this application the term PCM will be used, generically for the unit having the engine control function applicable to the inventive PS/P technology, including fueling and firing via EFI and DIS systems.

The inventive system is applicable to any liquid or gaseous fueled IC engines of 2 and 4-cycle mode. At present, the preferred application of the invention is to fuels such as: diesel (normal and biodiesel); gasoline; alcohols and blended fuels (e.g., gasohol); and propane, natural gas and syn-gas fueled IC engines having Distributorless Ignition Systems (DIS) and ported or direct EFI controlled by a PCM. The actual operating example engine described herein is an over-square, normally aspirated, EFI DIS 90°V12 run on 92 octane pump gas, injected and fired in the inventive Progressive Single/Pair fueling and firing sequence method as enabled in a firmware algorithm of the PCM. The inventive system is applicable equally to normally aspirated engines, or turbo-charged or super-charged engines. In addition, the inventive system is applicable to a wider than usual range of Displacement On Demand operation, in that by fuel supply control to individual cylinders, the inventive engine can be converted from V12 operation to V8 or V4, depending on load conditions, in order to conserve fuel.

The inventive system is implemented through the use, in any type of 90°V12, of Progressive Single/Pair fueling and firing of cylinders (herein "PS/P" fueling/firing sequence). That is, single cylinder(s) are fueled and fired, followed by multiple pairs of cylinders fueling/firing. The innovative PSP fueling/firing sequence for 12 cylinder operation may be in any timed sequence of Single/Pair cylinder firings, in all cases all 12 cylinders firing as if the V12 was a virtual V8 or a V10, since in total there are 8 ignition signals sent by the DIS, for example:

A. V10: four single cylinder firings in sequence (4 cylinders), followed by a simultaneous firing of a pair (2 cylinders), total 6; and repeat (total 12); however in this mode, there are only 10 fueling and firing sequences, therefore effectively a virtual V10; or B. V8: four single cylinder firings in sequence (4 cylinders), followed by a sequence of four pair, each in the pair firing simultaneously (8 cylinders), total 12; or C. V8: one single, one pair (3 cylinders total), repeated four times (total 12); or D, E, F. vice versa, as to the sequence of each of A-C.

The sequences can be represented as follows:

A. (4/1s, 1/2; 4/1s, 1/2), or: 1,1,1,1,2,1,1,1,1,2=12;

B. 4/1s,4/2s, or 1,1,1,1,2,2,2,2=12, or

C. 1/1, 1/2; 1/1, 1/2; 1/1, 1/2; 1/1, 1/2=12, or 1,2,1,2,1,2, 1,2=12; or

D, E, F. The reverse of A, B, C symbols.

The inventive system, when employing the novel PS/P fueling/firing sequence provides the advantages of: 1) permitting all cylinders in a 90°V12 to be set up for Even Fire; and 2) resolving the reciprocating assembly imbalance associated with an Even Fire 90°V12. The results of the inventive PS/P firing method being: greater power-to-weight ratio; lower CG than a 60°V-angle between cylinder banks; improved engine compartment layout; adaptability to all types of fuels and all fields of engine use; greater torque; greater overall power; slower running for improved engine life; lower cost per cubic inch displacement; full utilization of the displacement of all cylinders; and ease of production for engine constructors set up for conventional V8-type engine production.

By way of one, non-limiting example of implementing the inventive PS/P firing sequence method in a 90°V12, four single cylinders are sequentially fired at Even Fire (substantially TDC) in order, followed by four pairs of cylinders (8) Even Firing, for a total of 12. In this manner, a single or pair of cylinders is Even Firing every 90° of crankshaft rotation, as in a V8. Thus, the ECM computer firmware is programmed in the inventive system to signal the DIS to cause the coils to fire the plugs every 90°, with all 12 cylinders firing in 4 cycles, or 720° of rotation of the crankshaft, by firing eight of the cylinders in four pairs. This permits the engine to be constructed with a 90°V and yet be an Even Fire engine, thereby maximizing the power of 12 cylinders, as compared to Odd Fire 90°V12 engines.

The inventive system also addresses the problem of inherent imbalance that can occur in 90°V12 Even Fire engines. It is recognized that an Even Fire 90°V12, due to its geometry and rotational dynamics, will have inherent vibration amplitudes (imbalances) that cause roughness and could tear the engine apart at specific, high RPM(s). Unexpectedly however, the inventive PS/P firing sequence not only reduces the vibrational amplitude of imbalances, but also changes the vibrational peak (lowers it) to a few hundred RPM below about 2000 RPM. In addition, the method of the inventive system reduces or substantially eliminates the vibration in the reduced imbalance range (Imbalance Frequency Range, herein "IFR") of RPMs, by selectively controlling fuel feed to the paired cylinders that are firing simultaneously, herein termed "IFR Compensation". For example, IFR Compensation may be implemented by programming the ECU to starve fuel fed to the fuel injectors of one of the two cylinders in each pair of cylinders that are simultaneously fired during PS/P fueling/firing order. This is done by firmware algorithm programmed into the ECU to not electrically activate the injector solenoid in the cylinder to be starved during the IFR. Since no fuel is provided to that cylinder in the IFR, no ignition vibration is produced, and as a result, smooth operation throughout the RPM curve is obtained. Optionally, the ECU can control the DIS to not initiate coil discharge in the fuel-starved cylinders. That is, the fuel-starved cylinders are optionally not fired.

As a result of the method of the invention, the engine behaves in the IFR substantially as a balanced 90°V8. In non-IFR portion(s) of the overall engine RPM response range, the EFI and DIS are controlled by the PCM for full V12 operation, so that during the remainder of the useful engine speed range it functions as a well-balanced V12. Thus, by way of example, the selected PS/P IFR Compensation method fueling/firing order produced by the PCM results in low speed operations (less than 2000 rpm) with only eight cylinders receiving sufficient fuel to produce normal power levels in each of those eight cylinders, and the remaining 4 being leaned. Above 2000 RPM, and under load, all 12 cylinders receive sufficient fuel to produce full normal power in each cylinder.

In addition, this inventive PS/P IFR Compensation displacement adjustment method, employing fuel reduction or starvation of one of the two of each pair of pair-fired cylinders (conversion to equivalent V8 operation) may be used at low RPM as a normal mode of operation, with one or both pairs of the remaining 4 cylinders coming selectively, fully on line as RPM increases, e.g., above about 2000 RPM, as load requires. It is evident that the inventive system is easily implemented in a Displacement On Demand operational mode by pre-programmed or demand-mediated PCM EFI control, e.g., where engine load is sensed and signals representing load demands are sent to the PCM engine controller, integrated into the operational algorithm, and the fuel fed to each cylinder is adjusted in accord with the inventive principles disclosed herein.

This inventive IFR Compensation control method effectively adjusts powered displacement via PCM control of the EFI and DIS. The PCM EEPROM or other type of programmable controller of the engine can be pre-programmed at the factory, based on best practices, dynamometer and in-vehicle testing, or may be sensor mediated. In the latter case, knock or other vibration sensors (e.g., engine rocking, knock, vibrational motion transducers, strain gauges, or the like) are wired to provide input to the PCM's EFI/DIS controller to initiate, monitor and mediate conversion of the pairs to single cylinder powered firings by fuel reduction or shut off in one of the pair cylinders, thus converting the V12 to effectively a powered V8 during the sensed IFR.

For example, during low engine speed selected four cylinders of the four pairs, one in each of the four pair, are leaned of fuel so that minimal to no power is produced in those cylinders. As a result, the 90°V12 effectively operates as a 90°V8 in the sensed IFR RPM range. During engine speeds above 2000 rpm, the four formerly-leaned cylinders of the paired cylinders are normally fueled to produce power, returning the engine to a fully powered V12 mode. Using this process, the imbalance in the engine is minimized during the IFR(s), and is not noticeable to the vehicle operator as the transition through the relatively narrow IFR range (typically 200-400 RPM) is very short, timewise.

Since fuel type, altitude, load, RPM, air flow, engine temperature, engine use history, displacement and the like, may affect the firing, sensor-based PCM EFI/DIS control, alone or in combination with pre-programmed control, is presently believed to offer the most preferable anti-IFR (IFR Compensation) operation. It should be understood that the IFR is transitory, in that the engine passes through the vibration RPM range so quickly that there is no substantial or noticeable loss of power in the inventive control system, momentarily and transitorily reducing the engine operation from V12 to effective V8 displacement power.

In accord with the inventive system, there are additional significant advantages:

1. At full or wide open throttle, all 12 cylinders are operating and producing maximum power by being able to be operated as Even Fire by ignition at or near the appropriate advance before TDC;
2. At low engine speeds, only 8 cylinders provide substantive power to produce better fuel economy and substantially reduce or control vibration;
3. The same angular cylinder geometry used for an existing V8 (and many of the parts currently used) are also used in the 90°V12. In the designation system described herein, the "A" bank contains the odd numbered cylinders and the "B" bank the even numbered cylinders. Thus, the 6 and 10 cylinders are in the same, B bank, and at 360° of crankshaft rotation, the crank offsets for both of those cylinders are "high", that is, at the identical angle, 45° to the right of vertical (as seen from the aft end of the engine). Likewise, at 450° the 5 and 9 cylinder crank offsets are high, at the identical angle, 45° to the left of vertical. The 4 and 8 cylinders are high in the B block at 540°, and the 3 and 7 cylinders are high at 630° in the A block.
4. Implementation of the control system is straightforward. For example, a V8 PCM EFI/DIS controller(s) may be used, with four of the V8 EFI outputs doubled so that they are wired to solenoids of the injectors in pairs of the respectively paired cylinders for simultaneous actuation of fuel injection into the paired cylinders in the PS/P firing sequence; similarly, for IFR Compensation, EFI injector solenoid signal wires for one cylinder of each of the paired cylinders is implemented with an interrupter that is triggered by the RPM sensor of the crankshaft, so that in the IFR the signals to those four cylinders is interrupted with the result that a lesser amount of fuel is injected to lean or near-starve the cylinder so imbalance vibration is ameliorated;
5. Casting and forging geometry is essentially similar to V8 production; dedicated V12 tooling and fixturing costs are minimized;
6. An aluminum block and heads of the inventive 90°V12 weighs a mere 4 lbs. more than a cast iron 90°V8 Block with aluminum heads; thus for 50% more power only 4 lbs are added, with a substantial power-to-weight ratio increase;
7. For a 90°V12 of the same displacement as a V8, the lower engine RPM at load conditions result in substantially improved fuel economy when compared with that same displacement 90°V8.

With respect to engine control sensors, a full suite of standard sensors may be used to provide inputs to the PCM (including its sub-modules, depending on the particular architecture of the controller), including but not limited to:

Throttle Position sensor which the PCM uses to calculate load on the engine;

Engine Speed sensor (RPM);

Knock sensor(s);

Vibration sensors, for detection of IFR range limits and in-range characteristics;

Crank, Valve or/and Camshaft Position sensor(s), typically Hall Effect sensors which signal, by position for each cylinder when that cylinder's particular injector is ready for fuel injection and firing;

Intake Air Temperature sensor(s) (IAT), typically disposed in the air intake manifold, particularly important to sense when the engine is cold;

Fuel Pump operating and Fuel Pressure sensor(s);

Airflow, including Mass Air Flow (MAF) sensor(s), or/and Manifold Absolute Pressure (MAP) sensor(s), mounted in connection with the air intake. The MAP sensor is also known as an Absolute Pressure Sensor (APS). Typically the MAF measures air flow rate and that is converted to air mass in the PCI system controller algorithm. The PCM system adjusts fuel feed and ignition timing for output signals to the EFI and DIS, inter alia, in relation to MAP, coolant temperature, RPM, air flow, fuel type, load, atmospheric pressure, and other recognized factors. Of course, turbocharging and supercharging boosts pressure to the cylinder air intake valves, and thereby the air mass to the engine. Typically, the PCM computer controls the boost pressure by an output signal to a wastegate actuator that dumps excess pressure; this may occur during heavy acceleration;

Barometric Pressure sensor (BARO), which input is used by the PCM to compensate for altitude, typically 1" lower pressure per 1000' gain in altitude by selecting fueling and firing maps for the altitude sensed;

Engine Temperature, typically using Coolant Temperature sensor(s) (CTS), as a measure of engine temperature, which the PCM uses to calculate or select from an appropriate map, the proper fuel to air ratio;

Exhaust Gas Recirculation sensor(s) (EGR), including pintle position sensor of a thermal vacuum valve, for EGRs using that system; and Exhaust Gas Oxygen sensor(s) (O2S), typically mounted in the exhaust manifold or ahead of the catalytic converter in the exhaust pipe for the ECU to fine tune the fuel trim. The O2S is a fuel correction sensor, providing a signal to the EFI system ECU as input to the algorithm to maintain as near stoichiometric air/fuel ratio as possible, particularly at light engine load. Typically an O2S needs to be maintained hot, on the order of >600° F., hence its preferred position in the manifold trunk, downstream of the junction of the individual exhaust branches out of each cylinder. In multi-bank engines, an O2S may be used in each bank trunk, and for the case of the inventive 90°V12, an O2S sensor can be installed in each branch from each cylinder so that as the individual cylinders are fueled, the oxygen in the output exhaust gas can be sampled and the signal input to the computer controller to adjust the fuel trim to that cylinder via injector pulse width changes initiated by the PCU algorithm.

Exhaust Gas Temperature (EGT) sensor(s), one or more thermocouples located in the exhaust manifold, the manifold of each bank, or optionally and preferably in the branch from each cylinder as a feed back to the PCM to adjust the fuel trim to each cylinder in response to the EGT via control by the PCM of the injector pulse width; this permits the Dynamic Engine Balance as described herein.

Vehicle Speed sensor (VSS), which may be used to trim the load compensation settings.

One skilled in the art will recognize that various automotive and engine companies have different architectures for engine controllers, and accordingly use different suites of sensors for sensor-mediated engine control, or for trimming of the map settings. Thus, the above list is exemplary and not meant as a limitation on the scope of the inventive PS/P technology.

The solenoid of the fuel injector is typically de-energized (normally closed), and is opened by the power signal from the PCM. Fuel is injected, either into the airstream for all cylinders, into the airstream of each individual cylinder (Port Fuel Injection, or PFI), or directly into the cylinder (in direct fuel injection systems, such as diesel and biodiesel engines), by energizing the solenoid coil(s). The length of time the coil is energized to activate the stroke of the plunger defines the duration of fuel feed, called fuel pulse width, and is proportional to the amount of fuel needed. There a number of different arrangements for fuel injectors: Throttle Body Injector systems (TBI) in which the injector(s) inject fuel into the airstream before it is split into branches to the intake valves of each cylinder; Port Fuel Injector systems (PFI), in which the injectors are located in the air inlet branches just upstream of the intake valves; and Direct Fuel Injection (DFI, typically for diesel engines), where the injector sprays the fuel directly into the cylinder. TBI injectors are typically "fired", that is turned on, to inject fuel once per RPM sensor signal, while PFI systems may be "gang fired", meaning they are turned on once per crankshaft revolution. In sequential fuel injection, the PCM outputs one driver signal for each injector, and the injectors are "fired", turned on, individually in the engine firing order. There also may be cold start routine in the algorithm to provide a rich injection for cold start up; this can be initiated from a crank signal from the starter solenoid.

Typically, the inventive computer control EFI algorithm monitors eight or more inputs to determine change in the engine load, inter alia: AC clutch or pressure sensor; radiator fan; cruise control; battery voltage; brake switch signal; MAF or MAP; park/neutral switch; power steering pressure switch; RPM of engine; transmission (gear in which the engine is operating); Throttle Position Sensor signal; and Vehicle Speed Sensor signal.

There are a number of additional switch sensors that condition entry into the engine load algorithm or otherwise affect the engine operation, e.g., by signaling the computer to conditions that affect engine operation or load output signals, inter alia: EGR vacuum; EGR temperature; fuel pump prime; ignition switch; transmission oil temperature; idle speed control; anti-theft; and vacuum brake.

In a DIS, Distributorless Ignition System, the controller relies on the camshaft, crank (including RPM sensing) or valve position sensors to determine the piston position and RPM to electronically control the discharge of each coil associated with each cylinder to initiate the spark for that cylinder. The PCM computer uses the VSS signals to determine when to engage the torque converter clutch and/or shift the electronic transmission.

PS/P Technology IFR Compensation Employing Selective Leaning:

A 90°V12 engine would have a range of engine speed (RPM) where peak vibrations due to imbalance would be unacceptable (the IFR described above), absent the inventive PS/P fueling/firing order technology and method of engine operation. This IFR would occur in a carbureted or throttle body injected 90°V12 not employing PS/P where the fuel was distributed at the inlet to the intake manifold to all cylinders simultaneously. That type of fueling makes it difficult, if not impossible, to compensate smoothly for IFR.

In contrast, the use of port electronic fuel injection, where the fuel is introduced at an intake "port" (branch air supply tube downstream of an air intake manifold) nearest the cylinder intake valve, or direct fuel injection where the fuel is introduced directly into the cylinder, allows the inventive PS/P technology to ameliorate or eliminate vibrational imbalance in the IFR by control of fuel flow. This is implemented by programming the PCM controller microprocessor to reduce or eliminate EFI fueling to selected cylinders during the peak imbalance, IFR, period, yet maintain the PS/P firing schedule of the inventive 90°V12. By way of definition, the "first" cylinder of a pair-fired cylinder pair in the inventive PS/P technology will be denominated the "fully-fueled" cylinder, while the "second" cylinder of that pair will be the "lean-fueled", "lean", or "leaned" cylinder.

This invention, using PS/P technology in a 90°V12, minimizes or eliminates vibrations while passing through the IFR under peak load (maximum power output) by controlling fuel supply to the second cylinder of each pair of the pair-fired cylinders such that the fuel supplied to that cylinder is very lean (an air fuel ratio of approximately 20:1). The result is that a minimal amount of power is generated in that second cylinder of the pair. As noted, fuel is introduced by actuating the fuel injector solenoid. The PCM microprocessor, in the inventive PS/P technology, controls the pulse duration to the solenoid, thus controlling the solenoid "OPEN" period and thereby the amount of fuel injected. Shortening the pulse duration to a selected cylinder of each pair "leans" that cylinder. This allows for essentially V8 power output in the inventive 90°V12 engine during the peak imbalance IFR period without generating unacceptable levels of vibration. Even though all 12 cylinders fire, four of them are lean (the four, second cylinders of the four, pair-fired cylinders), thus not contributing significantly to the imbalance vibration.

The IFR peak imbalance period range occurs below about 2000 RPM in the inventive 90°V12, typically 1600-1800 RPM, which is the range in which lower power typically is needed. Thus, the "fully fueled" remaining eight cylinders are programmed for an amount or degree of fueling, including injecting fuel into the first cylinder of a pair-fired pair, to be varied "normally", that is, depending upon engine speed and load (via signals from sensors to the engine Powertrain Control Module microprocessor). Those eight cylinders are: the four single-fired cylinders, plus the first cylinder of each of the four pairs of pair-fired cylinders.

One skilled in this art will appreciate that on alternate cycles, which cylinder is the first cylinder (fully fueled) and which is the second cylinder (leaned) in the pair-fired pairs, can be switched (reversed). This technique is called "Alternate Leaning" in one of the cylinders of pair-fired cylinder pairs.

This PS/P method of lean fueling the second cylinder, while fully-fueling the first cylinder of each pair of pair-fired cylinders is the key to eliminating or minimizing what would otherwise be an unacceptable level of vibration in a 90°V12. It should be noted that in wide open throttle (under load), the air:fuel ratio is about 10.5:1. In lean cruise, 15-16:1. Starved is about 22:1 (also known as "dead lean"). Stoichiometric is 14.7:1. Thus, using the inventive PS/P technology-operated 90°V12, each cylinder can be individually controlled to run from just short of missing (about 20:1, "near-starved" or "lean"), as well as up to full throttle with all cylinders producing full power throughout the entire RPM range. The essentially "unpowered" second, leaned, cylinder of the pair is fired (the ignition coil trigger is activated by the microprocessor), which assists in clearing out any unburned gases in the cylinder and reducing emissions. However, since there is little combustion force on the crankshaft, there is substantially little or no power amplitude from that cylinder to generate IFR vibration in the leaned fueling RPM range.

While fuel control is implemented using the standard sensor inputs, including engine speed, MAP, coolant temperature, throttle position and load, to name principal ones, to the PCM that is programmed as described herein, additional feedback loop control architecture employing Exhaust Gas Temperature (EGT) or/and Exhaust Gas O2 sensors may be employed. These sensors are typically located in the exhaust header upstream of the catalytic converter. A single EGT thermocouple can be located in the branch exhaust pipe about 1-2" downstream of the exhaust valve of the #1 or #2 cylinder (or both) as exemplary of the temperature of the entire engine or the cylinder block A or B. However, it is preferred to locate one EGT sensor in each branch of the header just downstream of each cylinder's exhaust valve(s) and upstream of the trunk header (which merges into the exhaust pipe(s). This multi-sensor (1 per cylinder) engine control architecture provides precise and dynamic balancing of fuel to each cylinder throughout the RPM range under a wide range of loads, and is called herein "Dynamic Fuel Balancing" of the engine. While engine parts are conventionally statically and dynamically balanced, the inventive PS/P technology adds a third layer of balancing for refined operation, Dynamic Fuel Balancing. This results in longer engine life, better power output, improved fuel economy and lower emissions.

In the GM vehicle used as the test mule, described below in the Examples of implementation of the invention, the PS/P technology control and change in fuel flow is preferably accomplished using fuel maps that are contained in the Powertrain Control Module (PCM). The PCM contains one or more microprocessor(s) programmed with one or more algorithms that employ(s) signals from sensors representing critical engine parameters, depending upon the mode of operation. The PCM contains fuel maps programmed into the chip data memory which control the duration for the amount of injector open time (pulse duration), in what is known as timed port fuel injection. The same pulse duration fuel data base map is used for direct (into the cylinder) fuel injection. The amount of time that an injector is open in conjunction with the size of the injector orifice and the pressure differential across the orifice dictates the flow rate and total fuel volume injected into the cylinder.

That is, a typical, exemplary algorithm is generally simplified as: $Vf \sim R \times Tp \sim k \times \Delta P \times Ai$; where: Vf is total fuel volume in cubic centimeters; R is flow rate of fuel in cubic centimeters (or liters) per second; Tp is the injector pulse duration in milliseconds; Ai is the annular cross section in square centimeters of the orifice opening; ΔP is the pressure differential in psi or barr across the injector orifice; and k is a proportioning pressure constant.

It should be understood that with PS/P technology, the engine can be leaned to effectively operate with 4, 6 or 8 fully-powered cylinders through an extended range, not just the IFR imbalance range. Thus, the PCM's EFI control microprocessor can easily be programmed by conventional techniques to include maps that are accessed and used for EFI fueling and DIS firing when the vehicle is sensed as cruising with moderate, or light, or negative load (downhill or long flats), in a more continuous V4, V6 or V8 mode, depending on engine speed and load. Alternately, conventional Displacement On Demand maps may be accessed and employed to control engine operation of the inventive 90°V12, in addition to the PS/P technology. Since the EFI is microprocessor controlled, one skilled in the art will appreciate that there is no conflict between such techniques, and straightforward logic diagrams can be employed to implement the microprocessor control architecture.

With respect to implementation of the inventive PS/P technology in the inventive 90°V12, appropriate lean fuel maps in accord with the principles described herein are created and stored in a conventional V8 PCM for use when operating on twelve cylinders. When operating on eight cylinders, the conventional V8 fuel maps are used. Further, GM as well as other manufacturers have created various technologies, such as Displacement On Demand, to allow their 90°V8s to run effectively on four cylinders using a variety of methods, none of which incorporate the inventive PS/P technology. The previously referenced unchanged original fuel injection maps are numerous and each one contains the combination of time duration for injector OPEN (injector pulse), based on engine speed and manifold absolute pressure (also referred to as engine vacuum), and throttle position. Since this combination has three variables, a three-dimensional map, or series of two-dimensional maps, are necessary in order to include the combination of variables and resultant time duration for injector opening (fueling pulse). An example of a map for a single throttle position opening in conjunction with varying engine speeds, engine temperature and manifold absolute pressures (load) is shown in Table 3.

When using PSP technology, these same fuel maps are used for the single cylinders as well as both cylinders of the pair, except when near and in the peak imbalance vibration range, the IFR, (of engine speed). Only when the PS/P 90°V12 is operated near and in its peak imbalance vibration range, the IFR, is the fuel injector for the second cylinder in each pair controlled by the PCM using a different set of fuel maps in accord with the principles described herein. The controller microprocessor accesses the maps to obtain the data points used to cause the EFI controller to reduce (lean) or eliminate (starve) the fuel supply to those second cylinders in each pair. Optimal times for injector opening or pulse duration are based on tuning characteristics associated with the particular vehicle application, typically including vehicle weight, engine compression ratio, camshaft lift and duration, and other well-recognized parameters.

With respect to ignition maps, in a typical V8 engine, the peak power is developed at 12° after Top Dead Center (TDC), since it takes some time for fuel to burn to develop peak pressure. The ignition usually is programmed (mapped) into the microprocessor to fire in advance of TDC (called "advance"), e.g., from about 7°-40° before TDC, more advance being required for better grade fuels with slow flame front propagation, such as high octane, or alcohol based fuels. The fuel injection generally occurs microseconds before the ignition.

In the 90°V12 pair firing mode using the inventive PS/P technology, typically the pairs are fired in accord with an ignition map programmed with less advance, typically on the order of 3° before TDC, as compared to 7° before TDC in a V8. Thus, the ignition map in the inventive PS/P technology may pair fire with slightly less advance. However, it should be understood that selecting the amount of advance for a particular engine is part of the ordinary tuning process, is easily determined, and the IFR engine vibration smoothed by control of fuel and "dialing-in" the optimum advance in the process of tuning the engine.

Unlike the change in pulse duration or injector open time for the second, lean cylinder in each pair, the ignition maps for the inventive PS/P technology contained within the PCM typically are not changed with the exception of the optimization of tuning for the entire engine in its particular application. In fact, in the preferred embodiment of the inventive PS/P technology, it is advantageous to continue to provide optimal ignition and spark in each cylinder to completely ignite any unburned hydrocarbons, thereby minimizing emissions generation. An exemplary, separate ignition map is shown in Table 4 below for reference; this can be used as such, or changed minimally to accommodate the greater power output from the 90°V12.

Fuel injection and ignition maps may be programmed into the EEPROMs of the PCM (or VCM, ECU, ECM or EFI controller, as the case may be for a particular engine; the acronym is irrelevant, the focus herein is on the programmable microprocessor that controls the fuel injection and firing functions), by use of any one of commercially available PCM controller programmers, such as an HP Tuner, commercially available in the trade from HP Tuners, LLC, Buffalo Grove, Ill., USA (HPT). HPT offers an application program called the "VCM Editor utility", described by it as "a comprehensive VCM/PCM (Vehicle Control Module/Powertrain Control Module) programmer and parameter editor." The HPT VCM Editor's "Flash Utility" allows the user "to read the flash memory of the VCM/PCM and save it to a binary file. The Flash Utility allows a valid calibration to be written to the VCM/PCM and also incorporates an automatic VCM/PCM recovery capability for ultimate protection against any reflashing problems that may be encountered. The VCM Editor also allows modification of the saved binary image. The VCM Editor allows the user to change and set all parameters such as Spark, Fuel, RPM Limits, Fan Operating Temps, Transmission Shift points and pressures, Speedometer settings and many, many more. The editor provides an easy to use graphical interface and many powerful table manipulation capabilities such as copying, scaling and shifting to name a few."

It should be understood that which of the cylinders in the pair may be leaned to minimize the IFR imbalance, is a simple matter of control, by swapping out the control wiring to the solenoids, or reprogramming the map. Thus, instead of the first cylinder of each pair being fully-fueled, and second leaned, that order can be reversed. In addition, the internal four cylinders may be leaned, and the external eight fully-fueled, e.g., 5, 6, 7 and 8 leaned while 1-4 and 9-12 are fully-fueled, or vice versa, it being important for proper dynamic balance that an equal number of cylinders in each bank are leaned, and an equal number are fully-fueled in the two banks. Thus, it is not a hard and fast rule that the first of each pair of cylinders be fully-fueled, or that the "A" bank of cylinders be even numbers and the "B" bank be odd numbered cylinders. The key to selecting the cylinders of the pairs to be leaned is reducing the IFR imbalance vibration.

It is a key feature of the inventive PS/P system that the pair-fired pairs are preferred to be centered in the engine. That dampens the vibration in the IFR, and the engine bearings can better tolerate the force of two cylinders firing simultaneously. In contrast, if the pair-fired pairs are the outside pairs, there is significantly more vibration, and the IFR may be extended. Thus, the single-fired cylinders 1, 2, 11, 12 are on the ends of the respective cylinder banks, and the pair-fired cylinders are interior of the single-fired cylinders. Further, it is presently preferred that during lean-firing in the IFR, the most exterior of cylinder of each pair is leaned, and the most interior is fired. Thus, of the 6/10 pair, 6 is full-fueled, and 10 is leaned; of 5/9, 5 is full and 9 lean; of 4/8, 4 is lean, 8 is full; and of 3/7, 3 is lean and 7 is full.

Those skilled in the arts of engine construction and control and of automotive design will recognize other advantages, and that a wide range of modifications and refinements will be evident and their implementation straight-forward.

BRIEF DESCRIPTION OF THE DRAWINGS

The invention is described in more detail with reference to the drawings, in which.

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

EXAMPLE 1

Construction and Operation of an Inventive 90°V12 Engine

Figure 1:
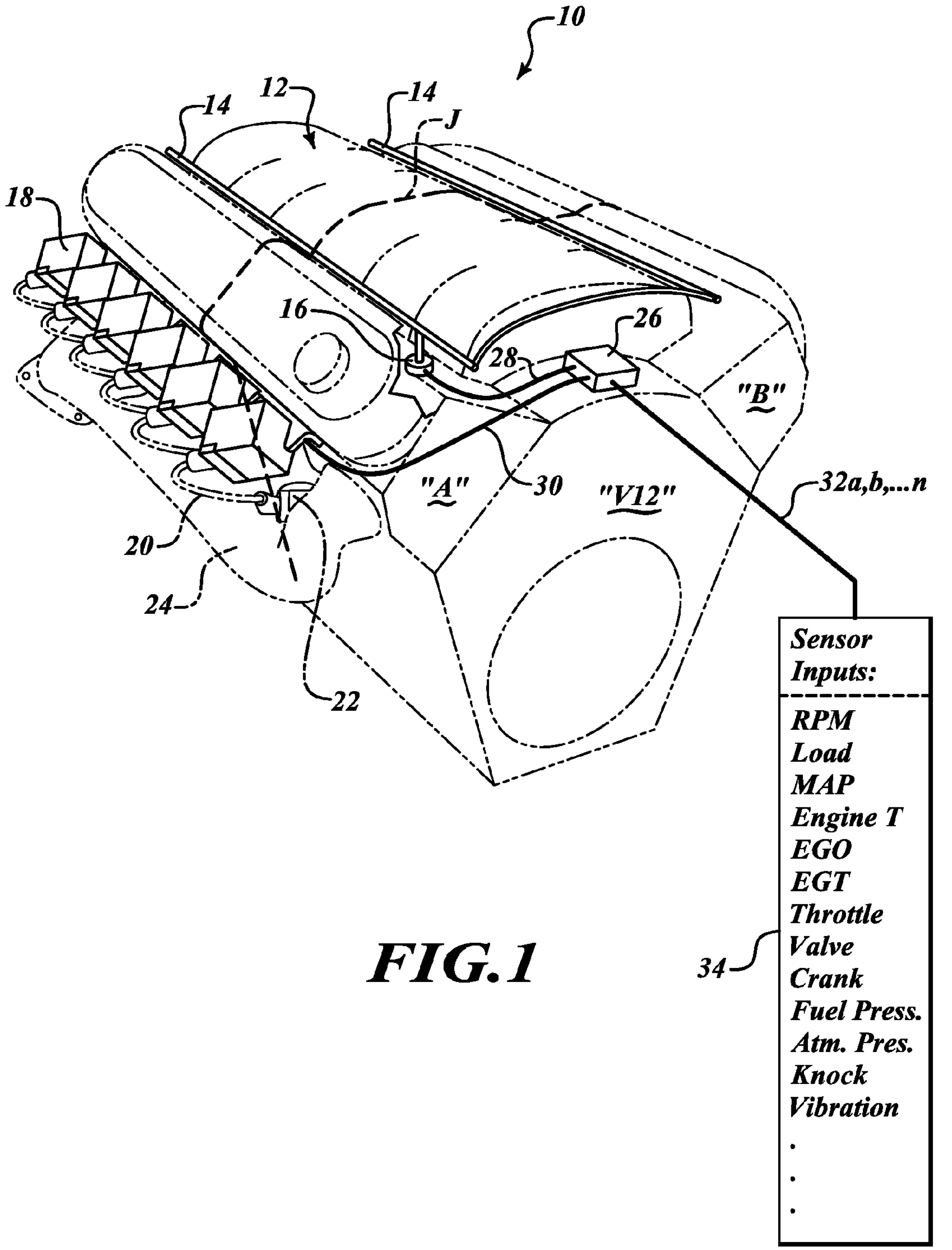
FIG. 1 is an isometric line drawing of an inventive 90°V12 engine employing PS/P firing technology in accord with the principles of the invention.

FIG. 1 shows an example of the inventive 90°V12 engine 10, constructed by modifying a pair of identical GM short block aluminum 90°V8 engine blocks, by milling off the rear two cylinders of block #1 and the front two cylinders of block #2. The two blocks were carefully aligned, heli-arc welded together and machine finished to form one, integrated 90°V12 engine block, identified as "V12" in the figure. As shown in FIG. 1, the aft end of the engine 10 is in the foreground; that is, the engine is being viewed as if from the driver's side. The left cylinder head bank, A, housing the odd-numbered cylinders and the right bank, B, the even-numbered cylinders.

A new crankshaft of high strength steel was machined with the appropriate angle orientation for the 12 piston connecting rod journals and fitted in the V12 block, borne by a total of 7 main journal bearings. That is, in a V8 there are 5 main bearings, of which one is a thrust bearing mounted at the #3 or #4 position. However, in the inventive V12 at least one additional bearing is added. Preferably, as done in this example, two bearings are added, one main and one thrust bearing, for a total of 7. The added thrust bearing was mounted at the #5 position and the added main bearing at the #4 position.

As with the V8 blocks, a pair of 6-cylinder, cylinder heads were made by cutting down and merging the two pairs of 4-cylinder heads of the respective V8s and finishing them for precise fit on the V12 block. The merged heads are identified as the "A" cylinder block head and the "B" block head in the figure. A pair of air intake manifolds were likewise merged and modified to fit the V12 footprint as a single air intake manifold 12. The join line is shown schematically at J.

A pair of full length fuel rails 14 feeding six injectors 16 in each cylinder block side (one per cylinder) were installed. As shown in the broken-away portion of FIG. 1, the injectors fit into the bottom of the fuel rails, and only one is shown to simplify the drawing. Likewise, only one injector trigger wire leads is shown, it being understood that each has its own lead. Twelve individual coils 18 were fitted on external brackets with leads 20 to the plugs 22 in the heads. A pair of exhaust manifolds 24 was constructed to provide six branch headers, one from each cylinder, to an exhaust pipe for each cylinder bank.

A PCM control system, shown schematically at 26, controls the EFI fuel injectors 16 via output trigger leads 28. The coils 18 are controlled by the PCM via the leads 30. The fuel injectors fed with fuel via the fuel rail assemblies 14, the control being in accord with a series of fueling and firing maps loaded in the controller 26, for sensor-mediated fuel feed and firing, including leaning of selected cylinders during IFR, for load-sensed operation, for DOD, and for cruising while not under load. An array of sensor inputs is shown schematically at 34 having respective inputs 32*a, b, . . . n* to the controller 26. These inputs 34 include, by way of example: RPM; Load; Manifold Air Pressure; Engine Coolant Temperature; Exhaust Gas Temperature; Air Flow; Throttle Position; Piston and/or Crank Position; Valve Position; Exhaust Gas O2; Fuel Pressure; Atmospheric Pressure; Knock; Vibration, and other conventional sensors. The EFI may be a port injection system, typically for gasoline, ethanol, methanol, propane and hydrogen fuels, or a direct injection system, typically for diesel, bio-diesel, kerosene, JP or other heavy fuels.

The resulting engine is an over-square 3.98" bore×3.662" stroke, 527 cu. inch 90°V12, PCM programmed for Even Fire at normal aspiration for EFI/DIS operation using 92 octane pump gasoline at 10.7:1 compression ratio.

The inventive engine was installed in a 2002 Chevrolet Suburban. To make room, the standard pully-driven radiator fan and shroud were removed. The OEM fan setup was replaced with dual, electrically driven pancake fans under a short shroud. The inventive V12, being only on the order of 9" longer than the OEM V8 that came with the vehicle, fits easily within the standard Suburban engine bay. A single V8 PCM EFI and DIS ignition coil controller was used, and hardwired in parallel to the paired cylinders to inject fuel and fire in the sequence shown in Table 1, below.

While the programming of the PCM controller is the presently preferred embodiment of implementing the inventive PS/P technology method of engine operation, the inventive system can be implemented electro-mechanically in a hard-wired mode. In the DIS system used with EFI fueled engines, external spark coils are used, each of which is provide with a separate 12 V power supply. The coils are not grounded until the PCM microprocessor sends a signal via a 5 mv control circuit, which switches ON and OFF per input from sensors, such as inductive Hall Effect crank position sensor(s). Variable valve engines typically also use Hall Effect sensors to sense the valve positions to change the valve solenoid actuation times. The Hall Effect inductive sensors are used for timing both the fuel injection pulse and the ignition timing. Thus, for the hardwire implementation, the coil trigger wire for one of the cylinders of the pair-fired cylinders may be spliced with a wire to the second of the cylinders of that pair for parallel firing. Thus the #6 cylinder wire is spliced to the #10 cylinder wire, the 5 to the 9, the 4 to the 8 and the 3 to the 7. This means that the ground signal goes in parallel (simultaneously) to each cylinder in the pairs 6/10, 5/9, 4/8 and 3/7. Thus, a standard V8 ignition map can be used to fire the inventive 90°V12 in accord with the PS/P method.

In the alternative, a DIS controller typically has some 30 unused output pins, so that four of them may be wired directly to the respective spark plugs, and the firing map data reprogrammed to fire sequentially in four single cylinders and four pairs, each pair simultaneously, as described above.

With respect to a hardwire mode of leaning one of the two cylinders in each pair, the trigger wire to each of selected cylinders is spliced, and the splice wire connected to the other cylinder, the second cylinder, so that cylinder pairs are simultaneously fueled. The splice wire also includes an RC (resistor/capacitor) circuit for shortening the pulse. The RC circuits of the four second cylinders are ganged to a master switch (conveniently in the dash) and manually triggered for the 1600-1800 RPM range as indicated by a tachometer. Alternately, the RC circuit master switch is slaved to contacts in the tach at 1600 RPM and at 1800 RPM, so that ascending or descending through that IFR range, the RC circuit shortens the injector solenoid signal, leaning the respective second of the two cylinders in each of the four pairs in that IFR.

TABLE 1

PS/P Fuel Injection and Firing Order for Inventive 90°V12 by Cylinder #, at load, >2000 RPM

| | Cylinder # | | | | | | | |
|---|---|---|---|---|---|---|---|---|
| | 1 | 12 | 11 | 2 | 6/10 pair | 5/9 pair | 4/8 pair | 3/7 pair |
| Fuel Injection and Firing Order | 1st | 2nd | 3rd | 4th | 5th, 1st pair | 6th, 2nd pair | 7th, 3rd pair | 8th, 4th pair |

The inventive 90°V12, 527 C.I. engine was started, tuned and the vehicle driven in various tests of normal operation on standard 92-Octane pump gas, both empty and under load, at both stop-and-go and highway speeds. The engine performed excellently, outputting an estimated 530 hp on 92-Octane pump gas, as compared to the OEM V8, rated at 346 C.I. with output of 350 hp with that gasoline.

Figure 2:
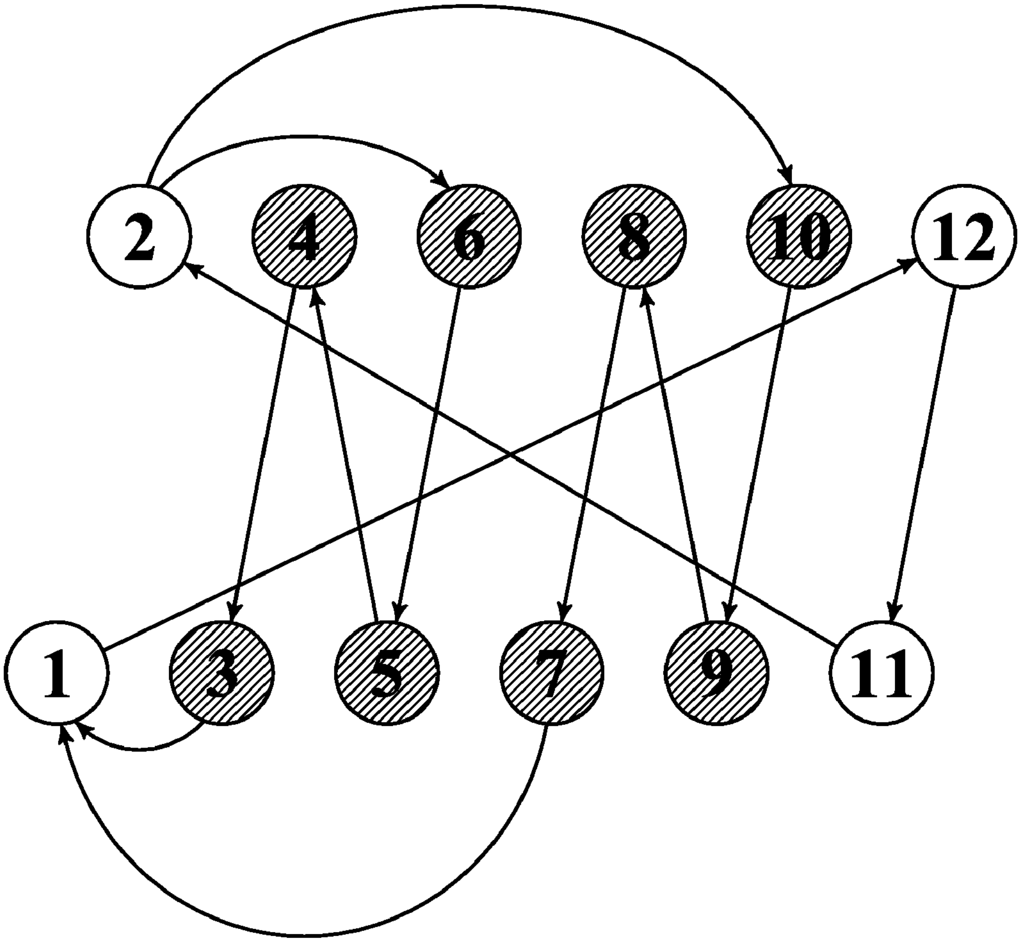
FIG. 2 is a plan view schematic of the paired banks of cylinders of the inventive 90°V12 of FIG. 1 showing the PS/P fueling/firing sequence at mid-range and above, RPM, and at high loads, with the paired cylinders shown cross-hatched.

In FIG. 2 the forward end of the engine is on the left and the aft end of the engine is on the right. The top row of numbered circles represents the even-numbered cylinders of the B block, and the bottom row of numbered circles is the A block (see FIG. 1). The pair fired cylinders medial of the end cylinders are the set of four pair-fired cylinders. Starting with cylinder 1 at the forward end of block A, follow the arrows to see the injection/firing sequence. It begins with four single cylinders on the front and aft ends of the engine, cylinders numbers 1, 12, 11 and 2. Starting with 1, follow the arrow to 12, then to 11, and then to 2. This single cylinder firing sequence is followed by the middle eight cylinders firing in sequenced pairs: 6/10, 5/9, 4/8 and 3/7. From 2, note two arrows go to cylinders 6 and 10. From 6 the arrow goes to 5 and simultaneously from 10 to 9. The result is that after 6/10 fire simultaneously, 5/9. Following on, 4/8 fire, then 3/7. Note from 3/7 two arrows go back to 1 and the sequence starts again.

Figure 3:
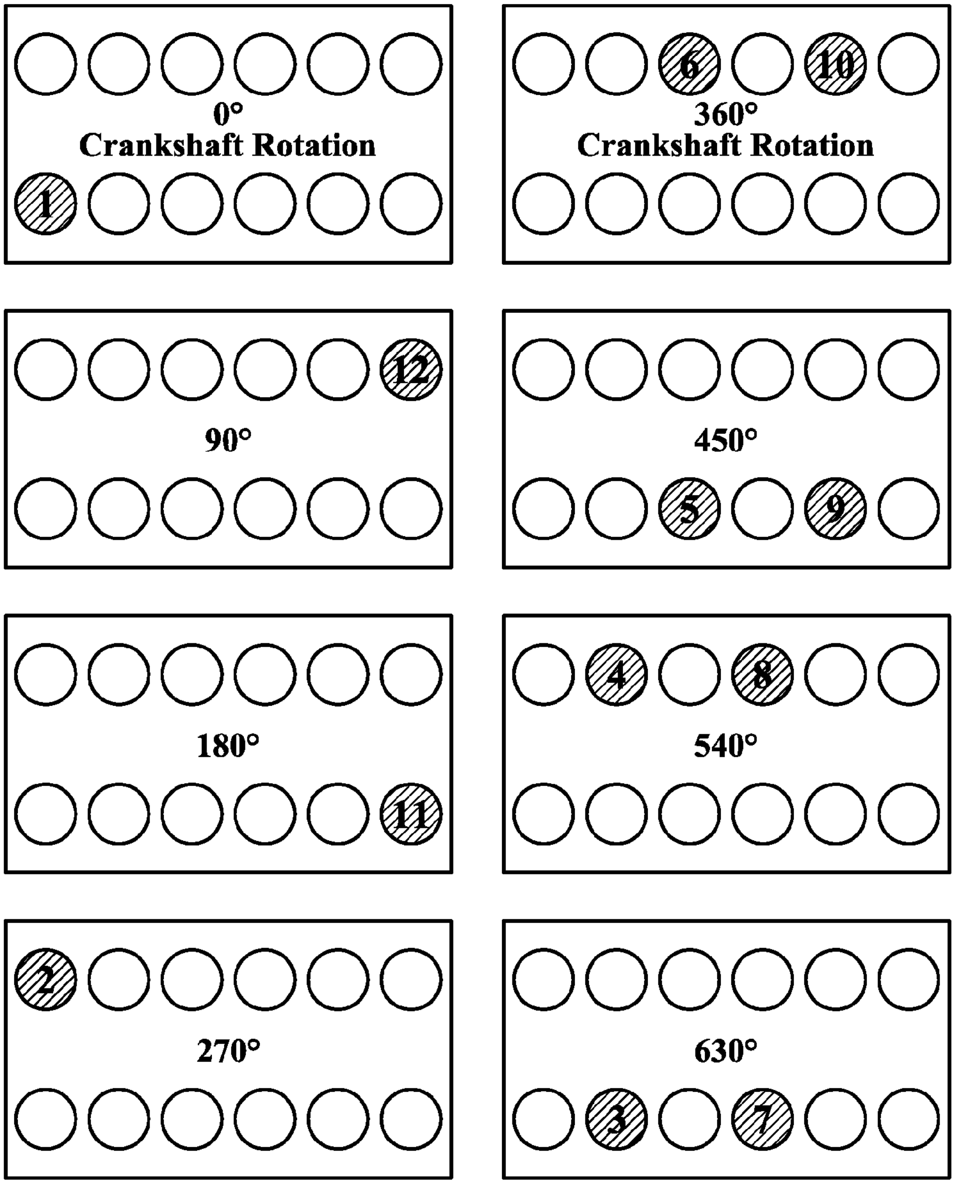
FIG. 3 is a series of eight illustrations of the cylinder fueling/firing sequence at given crankshaft rotation angles of the plan view of the engine of FIGS. 1 & 2, the firing cylinder being numbered and cross-hatched.

FIG. 3 is a top view of the cylinder injection and firing sequence in relation to the crankshaft rotational position, the forward end of the engine being on the left, and the aft end on the right, the top row of circles the cylinders of the B bank, and the bottom row the A bank, just as in FIGS. 1 and 2. As seen starting with the top left and proceeding down the left column, each 90° one of the cylinders fires through the first full rotation, 0°-360°, of the crankshaft (4 total Then on the second rotation, 361°-720°, the pairs fire, with pairs in opposite banks firing each 90°. In the second rotation an additional 8 cylinders are fueled and fired, the total being 12. This cycle repeats every 720° of rotation (2 revolutions, or 4 strokes).

EXAMPLE 2

IFR Compensation System

The engine of Example 1, FIGS. 1-3, exhibited transitory vibration in the approximately 1600-1800 RPM range (as determined by tachometer reading) due to imbalance. That is the IFR range for this particular engine; one skilled in this art will understand that each different engine configuration constructed in accord with the principles of the invention as a 90°V12 can be dynamometer tested to determine its unique IFR range and other characteristics.

To counteract the vibration, injector leads for cylinders 4, 6 on the right bank and 3, 5 on the left bank were removed. That is a simple, and direct, hardwire simulation of a production engine, resulting in dead lean fueling of those cylinders. In effect, the PCM "thinks" the engine is a V8, when in fact it is a V12. This means that in its simplest implementation, the inventive 90°V12 engine can use an off-the-shelf V8 PCM EFI and DIS controller systems, including sensors and outputs, with only selected outputs being doubled to control the cylinder pair fueling and firing.

As an alternate hardwire example, the RC circuit as described above may be used. In a production engine, EFI shorter pulse duration signals (or interrupts) are programmed into the EEPROM (e.g., as fueling maps) for the selected injector leads in the determined IFR (RPM range). In this example, the injector leads were left intact, but it should be understood that the EEPROM is programmed with appropriate injector pulses to lean the selected cylinders in the particular engine's IFR.

The engine was restarted, and operated up through about 3000 RPM. As the engine passed through the original IFR range, the vibration, initially experienced in full PS/P mode described above (Table 1) was substantially reduced to the point of being un-noticed by the vehicle operator. The interrupts, electromechanical in this example and electronic in a programmed PCM, effect from leaning to total fuel starvation of one of each of the cylinders in the pair in that IFR.

Table 2, below, shows the cylinder number fuel injection and firing order for this Example 1 engine during low speed or IFR operation in which the engine is converted from a V12 to a V8 operation by fuel starvation to cylinders 6, 5, 4 and 3.

TABLE 2

| IFR Compensation via Fuel Starvation<br>Firing Order of Remaining 8 Active (Fuel Supplied) Cylinders | | | | | | | |
|---|---|---|---|---|---|---|---|
| 1 | 12 | 11 | 2 | 10 | 9 | 8 | 7 |

Figure 4:
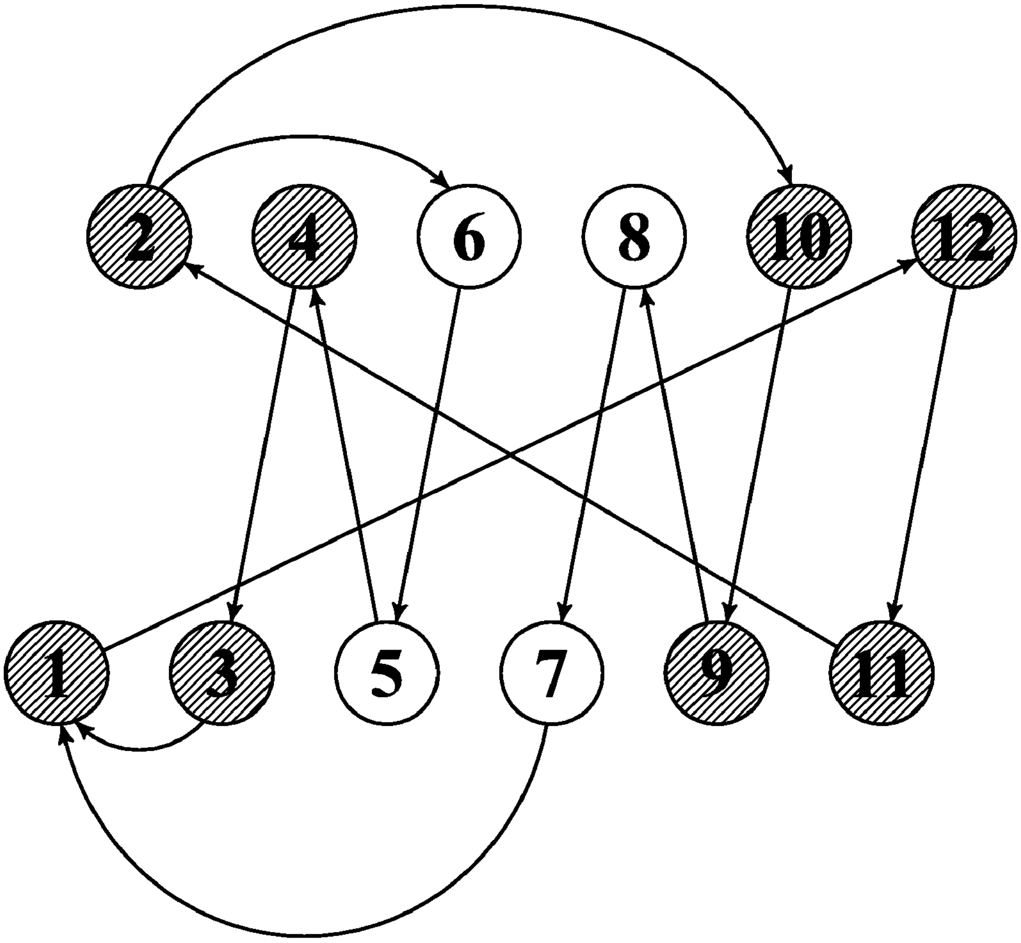
FIG. 4 is a plan view schematic of the banks of cylinders of the engine of FIGS. 1-3 during an IFR, showing one example of the inventive fuel flow compensation method of reducing IFR imbalance by leaning one cylinder of each of the four pairs, indicated as open circles, so that minimal or no power is produced in those cylinders, the remaining cylinder of each PS/P pair and the single-fired cylinders being fully-fueled, as shown by the cross-hatching.

FIG. 4 is a plan view schematic showing another example of the paired banks of cylinders of the Example 1 engine during low engine speed or during the IFR, in this case showing the middle four cylinders of the four pairs are starved of fuel (in this example, by leaning the respective injectors of cylinders 6-8) so that substantially no power is produced in those cylinders, converting the 90°V12 to operate as a 90°V8. In this schematic figure, the remaining single and pair cylinders that are fully-fueled are cross-hatched.

The EEPROM may also be programmed to convert the inventive 90°V12 to a DOD engine for 4, 6, 8 or 10 cylinder operation, depending on load demand. The programming may utilize fuel feed control in the appropriate number of cylinders in accord with the Dynamic Fuel Balancing principles of the invention to produce the desired power and torque output with least IFR. In the alternative, a DOD controller may be employed in the PCM.

EXAMPLE 3

PCM Controller Maps

The PS/P programming is straight-forward; the PCM controller EEPROM is configured to both inject fuel by signals to the injector solenoids and signals to the coils via the respective trigger wiring to simultaneously fuel and, at the appropriate time relative thereto (typically microseconds or milliseconds after initiation of injection), fire four pairs of cylinders: 6/10; 5/9; 4/8; and 3/7; in the sequence that a V8 would normally fire. The programming can be individual data entry into existing maps, or downloading a complete set of new maps for a particular engine. Tables 3 and 4 below are working examples of fueling and ignition maps that are programmed into the PCM controller in accordance with the inventive PS/P technology to implement it in the exemplary inventive 90°V12 engine having EFI and DIS systems controlled by the PCM microprocessor:

TABLE 3

PCM Controller Fueling Map, 92 Octane Pump Gasoline<br>Open Loop F/A Ratio (g/g) vs Coolant Temp vs MAP

| Manifold Absolute Pressure, in | COOLANT TEMPERATURE, ° F. | | | | | | | | | | | |
|---|---|---|---|---|---|---|---|---|---|---|---|---|
| kPA | (40°) | (22°) | (4°) | 14° | 32° | 50° | 68° | 86° | 104° | 122° | 140° | 158°-284° |
| 25 | 1.5 | 1.37 | 1.23 | 1.1 | 1 | 1 | 1 | 1 | 1 | 1 | 1 | 1 |
| 30 | 1.54 | 1.42 | 1.27 | 1.13 | 1.1 | 1.01 | 1.04 | 1 | 1 | 1 | 1 | 1 |
| 35 | 1.58 | 1.48 | 1.31 | 1.16 | 1.1 | 1.03 | 1.05 | 1.03 | 1.01 | 1 | 1 | 1 |
| 40 | 1.62 | 1.51 | 1.33 | 1.18 | 1.1 | 1.04 | 1.07 | 1.04 | 1.03 | 1.01 | 1 | 1 |
| 45 | 1.62 | 1.51 | 1.34 | 1.18 | 1.1 | 1.07 | 1.07 | 1.04 | 1.03 | 1.01 | 1 | 1 |
| 50 | 1.59 | 1.48 | 1.32 | 1.16 | 1.1 | 1.09 | 1.07 | 1.04 | 1.03 | 1.01 | 1 | 1 |
| 55 | 1.59 | 1.49 | 1.34 | 1.19 | 1.1 | 1.09 | 1.07 | 1.05 | 1.03 | 1.01 | 1 | 1 |
| 60 | 1.6 | 1.5 | 1.35 | 1.23 | 1.2 | 1.1 | 1.08 | 1.05 | 1.03 | 1.01 | 1 | 1 |
| 65 | 1.61 | 1.52 | 1.37 | 1.26 | 1.1 | 1.1 | 1.09 | 1.06 | 1.03 | 1.01 | 1 | 1 |
| 70 | 1.57 | 1.48 | 1.33 | 1.27 | 1.2 | 1.12 | 1.09 | 1.07 | 1.04 | 1.01 | 1 | 1 |
| 75 | 1.55 | 1.46 | 1.32 | 1.28 | 1.2 | 1.12 | 1.09 | 1.08 | 1.04 | 1.01 | 1 | 1 |
| 80 | 1.62 | 1.51 | 1.36 | 1.33 | 1.2 | 1.17 | 1.14 | 1.11 | 1.06 | 1.03 | 1 | 1 |
| 85 | 1.65 | 1.54 | 1.39 | 1.36 | 1.3 | 1.21 | 1.17 | 1.13 | 1.07 | 1.04 | 1 | 1 |
| 90 | 1.65 | 1.54 | 1.39 | 1.37 | 1.3 | 1.23 | 1.2 | 1.15 | 1.08 | 1.05 | 1.04 | 1 |
| 95 | 1.69 | 1.57 | 1.43 | 1.4 | 1.3 | 1.29 | 1.25 | 1.18 | 1.11 | 1.08 | 1.05 | 1 |
| 100 | 1.78 | 1.65 | 1.5 | 1.47 | 1.4 | 1.39 | 1.34 | 1.22 | 1.14 | 1.11 | 1.06 | 1 |

The values in the table represent the fuel to air ratio for 92 octane pump gas, as used above in the Examples 1 and 2 engine, for fully fueling. From the selected F/A data, the PCM consults a pulse width map and sends the trigger signal to the EFI solenoids. For the leaning algorithm, a factor of 14.7/20=0.73 is applied to the table's F/A ratio values for each sensed MAP and Coolant Temperature condition in the IFR range. For example, where the coolant temperature is 32° F. and the MAP is 60, the F/A ratio becomes 1.2×0.73=0.876 for selected cylinders in the IFR range. Thus, the algorithm is a function of RPM, the table values and the 0.73 factor, as applied to selected cylinders of the pair-fired cylinders to lean those cylinders. Of course, the leaning factor may be selected to be different, ranging from near-starve to less lean, as other factors require, e.g., load, altitude, EGT, fuel type, and the like.

TABLE 4

PCM Ignition Map
Open Throttle, 92 Octane Pump Gas
Main Spark (° advance or retard) v Air Flow v RPM

| Air Flow, | RPM OPEN THROTTLE, in hundreds | | | | | | | | | | | | | | | | | |
|---|---|---|---|---|---|---|---|---|---|---|---|---|---|---|---|---|---|---|
| g/sec | 4 | 6 | 8 | 10 | 12 | 14 | 16 | 18 | 20 | 22 | 24 | 28 | 32 | 36 | 40 | 44 | 48 | 52 | 56-80 |
| 0.08 | 19 | 22 | 27 | 30 | 34 | 38 | 41 | 41 | 41 | 41 | 40 | 40 | 40 | 39 | 38 | 36 | 36 | 38 | 38 |
| 0.12 | 19 | 22 | 27 | 30 | 34 | 38 | 41 | 41 | 41 | 41 | 40 | 40 | 40 | 39 | 38 | 36 | 36 | 38 | 38 |
| 0.16 | 19 | 22 | 27 | 30 | 34 | 38 | 41 | 41 | 41 | 41 | 40 | 40 | 40 | 39 | 38 | 36 | 36 | 38 | 38 |
| 0.20 | 19 | 22 | 27 | 30 | 34 | 38 | 41 | 41 | 41 | 41 | 40 | 40 | 40 | 39 | 38 | 36 | 36 | 38 | 38 |
| 0.24 | 19 | 22 | 25 | 28 | 33 | 37 | 39 | 40 | 41 | 41 | 40 | 40 | 40 | 39 | 38 | 36 | 36 | 38 | 38 |
| 0.28 | 19 | 20 | 23 | 27 | 32 | 36 | 38 | 39 | 40 | 40 | 40 | 40 | 38 | 37 | 36 | 36 | 36 | 36 | 38 |
| 0.32 | 16 | 19 | 22 | 26 | 29 | 33 | 36 | 37 | 37 | 37 | 37 | 37 | 36 | 35 | 35 | 35 | 35 | 36 | 36 |
| 0.36 | 13 | 18 | 22 | 25 | 28 | 31 | 35 | 35 | 35 | 35 | 35 | 35 | 35 | 34 | 34 | 34 | 34 | 34 | 34 |
| 0.40 | 8 | 14 | 21 | 24 | 27 | 29 | 33 | 33 | 33 | 33 | 33 | 33 | 33 | 33 | 33 | 33 | 33 | 33 | 33 |
| 0.44 | 4 | 11 | 17 | 21 | 24 | 27 | 29 | 32 | 32 | 32 | 33 | 33 | 33 | 32 | 32 | 31 | 31 | 31 | 31 |
| 0.48 | 0 | 8 | 13 | 18 | 21 | 25 | 26 | 29 | 30 | 31 | 31 | 32 | 32 | 32 | 30 | 30 | 29 | 30 | 30 |
| 0.52 | −3 | 4 | 11 | 15 | 18 | 21 | 23 | 25 | 27 | 29 | 30 | 31 | 31 | 31 | 29 | 29 | 28 | 29 | 29 |
| 0.56 | −5 | 2 | 7 | 11 | 15 | 18 | 20 | 23 | 25 | 28 | 29 | 30 | 31 | 31 | 29 | 29 | 28 | 29 | 29 |
| 0.60 | −5 | 1 | 5 | 9 | 13 | 16 | 18 | 21 | 25 | 27 | 28 | 29 | 30 | 30 | 28 | 29 | 28 | 29 | 29 |
| 0.64 | −5 | 1 | 4 | 8 | 13 | 16 | 18 | 20 | 25 | 26 | 28 | 28 | 29 | 30 | 28 | 28 | 27 | 29 | 29 |
| 0.68 | −5 | 1 | 4 | 8 | 13 | 16 | 18 | 20 | 25 | 26 | 28 | 28 | 29 | 29 | 28 | 28 | 26 | 28 | 28 |
| 0.72 | −5 | 1 | 4 | 8 | 13 | 16 | 18 | 20 | 25 | 26 | 28 | 28 | 29 | 29 | 27 | 27 | 25 | 28 | 28 |
| 0.76 | −5 | 1 | 4 | 8 | 13 | 16 | 18 | 20 | 25 | 26 | 28 | 28 | 29 | 29 | 27 | 27 | 25 | 28 | 28 |
| 0.80 | −5 | 1 | 4 | 8 | 13 | 16 | 18 | 20 | 25 | 26 | 28 | 28 | 29 | 29 | 27 | 27 | 25 | 28 | 28 |
| 0.84 | −5 | 1 | 4 | 8 | 13 | 16 | 18 | 20 | 25 | 26 | 28 | 28 | 29 | 29 | 27 | 27 | 25 | 28 | 28 |
| 0.88 | −5 | 1 | 4 | 8 | 13 | 16 | 18 | 20 | 25 | 26 | 28 | 28 | 29 | 29 | 27 | 27 | 25 | 28 | 28 |
| 0.92 | −5 | 1 | 4 | 8 | 13 | 16 | 18 | 20 | 25 | 26 | 28 | 28 | 29 | 29 | 27 | 27 | 25 | 28 | 28 |
| 0.96 | −5 | 1 | 4 | 8 | 13 | 16 | 18 | 20 | 25 | 26 | 28 | 28 | 29 | 29 | 27 | 27 | 25 | 28 | 28 |
| 1.00 | −5 | 1 | 4 | 8 | 13 | 16 | 18 | 20 | 25 | 26 | 28 | 28 | 29 | 29 | 27 | 27 | 25 | 28 | 28 |
| 1.04 | −5 | 1 | 4 | 8 | 13 | 16 | 18 | 20 | 25 | 26 | 28 | 28 | 29 | 29 | 27 | 27 | 25 | 28 | 28 |
| 1.08 | −5 | 1 | 4 | 8 | 13 | 16 | 18 | 20 | 25 | 26 | 28 | 28 | 29 | 29 | 27 | 27 | 25 | 28 | 28 |
| 1.12 | −5 | 1 | 4 | 8 | 13 | 16 | 18 | 20 | 25 | 26 | 28 | 28 | 29 | 29 | 27 | 27 | 25 | 28 | 28 |
| 1.16 | −5 | 1 | 4 | 8 | 13 | 16 | 18 | 20 | 25 | 26 | 28 | 28 | 29 | 29 | 27 | 27 | 25 | 28 | 28 |
| 1.20 | −5 | 1 | 4 | 8 | 13 | 16 | 18 | 20 | 25 | 26 | 28 | 28 | 29 | 29 | 27 | 27 | 25 | 28 | 28 |

Table 4 is a working example ignition map, the positive values on the table being degrees before TDC (advance) and the negative numbers being degrees after TDC (retard). The table maps the Air Flow, in grams/second, as measured by the hot wire MAF sensor which inherently compensates for variations in air temperature, vs the RPM of the engine to provide values for advance or retard for the PCM to pick in sending the ground signal to the coils to fire the cylinders. Thus, at 2000 RPM at Air Flow of 0.40 g/sec the advance is 33° before TDC.

It should be understood that as other parameters change, a different map is pulled up from PCM memory for the relevant data. Thus, the related series of maps can be represented and programmed as a 3-D graph, and the graph values used to construct a 3-D surface, permitting interpolation between values by the PCM algorithm picking intermediate values off the surface.

INDUSTRIAL APPLICABILITY

It is clear that the inventive 90°V12 engine, PCM controllers using PS/P Technology, IFR Compensation and Dynamic Fuel Balancing operational maps and systems of this application have wide applicability to the automotive and marine industry, namely to higher powered sports, recreational, transport, military, industrial and farm vehicles, and to a wide range of aircraft and vessels. The system clearly offers improved power to weight and fuel efficiency, yet fits in the footprint of present vehicle engine bays. The disadvantages of prior 60° and Odd Fire V12s are overcome by the PS/P fueling/firing controller and conversion to V8 displacement in the IFR. Thus, the inventive system is simple to implement and has the clear potential of becoming adopted as the new standard for apparatus and methods of operation of V12 engines.

It should be understood that various modifications within the scope of this invention can be made by one of ordinary skill in the art without departing from the spirit thereof and without undue experimentation. For example, the engine controller(s) can be easily programmed or reprogrammed to provide the DOD functionalities disclosed herein. Likewise the PS/P sequences may be varied from the several examples shown. While the example shown was for a normally aspirated pump gasoline fueled engine, it is easily adapted to methanol, ethanol, gasohol, kerosene, jet, marine, diesel and bio-fuels. This invention is therefore to be defined by the scope of the appended claims as broadly as the prior art will permit, and in view of the specification if need be, including a full range of current and future equivalents thereof.

The invention claimed is:

1. An improved V12 reciprocating internal combustion engine having an Electronic Fuel Injection (EFI) system, a Distributorless Ignition System (DIS) and a Powertrain Control Module (PCM) having fuel injector pulse and ignition maps to control fuel and fire the cylinders of said engine by said EFI and DIS systems, comprising in operative combination:

a. twelve cylinders disposed as a pair of multi-cylinder, cylinder banks in an engine block of 90°V12 geometry, each bank having six cylinders and terminating at the upper ends of said cylinders in a head, said block and said heads having a first and a second end;

b. each said cylinder contains a movable piston connected to a common crankshaft via a connecting rod, said crankshaft is mounted in said V12 engine block to rotate in seven bearings, at least one bearing being disposed adjacent each end of said block, and five bearings being distributed intermediate said end bearings and between connections of said connection rods to said crankshaft;

c. said PCM containing a microprocessor and a database structure comprising injector fueling maps and firing maps; and d. said PCM being programmed to control said engine for Progressive Single/Pair fueling and firing wherein fueling and firing of individual cylinders are triggered by said EFI and DIS systems so that four sequentially fueled individual cylinders are sequentially fired, and each pair of a set of four pairs of simultaneously fueled cylinders are simultaneously fired in sequence, so that in 720° of rotation of said crankshaft, all 12 cylinders are fueled and fired, said PCM controlling said firing with respect to the location of pistons in said cylinders to result in an even fired 90°V12 internal combustion engine having more torque and power output than an odd fired 90°V12 internal combustion engine of the same displacement.

2. An improved V12 reciprocating internal combustion engine as in claim 1 wherein:

a. said injector fueling maps provide data to said PCM to selectively control the triggering of pulse duration of individual cylinder fuel injectors of said engine EFI system so that four individual cylinders of said twelve cylinders are sequentially fueled, the remaining eight cylinders are grouped into a set of four cylinder pairs, and each of said pairs of cylinders are simultaneously fueled, said four pairs in said set being sequentially fueled, so that in 720° of rotation of said crankshaft, all 12 cylinders are fueled; and b. said ignition maps provide data to said PCM to selectively control the triggering of firing of individual cylinders by said DIS system so that said four sequentially fueled individual cylinders are sequentially fired, and each pair of said set of four pairs of simultaneously fueled cylinders are simultaneously fired in sequence, so that in 720° of rotation of said crankshaft, all 12 cylinders are fired, said PCM controlling said firing with respect to the location of pistons in said cylinders to result in an even fired 90°V12 internal combustion engine having more torque and power output than an odd fired 90°V12 internal combustion engine of the same displacement.

3. An improved V12 reciprocating internal combustion engine as in claim 1 wherein cylinders adjacent each end of said heads are denominated exterior cylinders, and the remaining cylinders between end, exterior cylinders are denominated interior cylinders, said PCM controlling fueling and firing so that the interior cylinders comprise the set of four cylinder pairs.

4. An improved V12 reciprocating internal combustion engine as in claim 3 wherein said two banks of cylinders consist of a first, A, bank having cylinders denominated with odd numbers 1, 3, 5, 7, 9 and 11, and a second, B, bank having cylinders denominated with even numbers 2, 4, 6, 8, 10 and 12, said cylinder numbers 1, 2, 11 and 12 are said external cylinders, and said cylinders are fueled and fired in the number order 1, 12, 11, 2, 6/10, 5/9, 4/8 and 3/7.

5. An improved V12 reciprocating internal combustion engine as in claim 1 wherein said engine exhibits an Imbalance Frequency Range (IFR) of RPMs, and said PCM controls the fueling of one cylinder of each pair of cylinders in said set to be lean in said IFR, thereby to minimize the vibrations produced by said imbalance.

6. An improved V12 reciprocating internal combustion engine as in claim 5 wherein in said IFR said PCM lean fuels said cylinder of each pair simultaneously with full fueling of the other cylinder of each pair, said full fueling including compensation by said PCM for at least one of engine speed, engine temperature, manifold absolute pressure and throttle position.

7. An improved V12 reciprocating internal combustion engine as in claim 6 wherein in said IFR, said PCM ignites said lean fueled cylinder of each pair in said set simultaneously with ignition of said full fueled cylinder of said pair so that they fire simultaneously, said firing of said lean fueled cylinder assisting in igniting residual unburned hydrocarbons in said cylinder, thereby minimizing emissions generation.

8. An improved V12 reciprocating internal combustion engine as in claim 1 wherein said PCM receives input signals from at least one of an Exhaust Gas Temperature (EGT) and an Exhaust Gas O2 (EGO) sensor to modify the amount of fuel provided to said cylinders in response to engine speed and load in a feedback loop for precise and dynamic balancing of fuel to each cylinder throughout the RPM range under a wide range of loads, thereby resulting in improvements in longer engine life, better power output, improved fuel economy and reduced emissions.

9. Engine control module for a 90°V12 reciprocating internal combustion engine having an Electronic Fuel Injection (EFI) system and a Distributorless Ignition System (DIS), comprising a microprocessor readable data structure disposed in a microprocessor memory of a Powertrain Control Module of said engine, said data structure having fueling and firing maps providing data outputs to said PCM for controlling said engine to operate in a mode of Progressive Single/Pair fueling by said EFI system and firing by said DIS system, wherein fueling and firing of individual cylinders are triggered by said EFI and DIS systems so that four sequentially fueled individual cylinders are sequentially fired, and each pair of a set of four pairs of simultaneously fueled cylinders are simultaneously fired in sequence, so that in 720° of rotation of said crankshaft, all 12 cylinders of said engine are fueled, and for controlling firing of said cylinders in at least one series of progressive single and pair firings, said firings occurring with respect to the location of pistons in cylinders of said engine to result in an even fired 90°V12 internal combustion engine having more torque and power output than an odd fired 90°V12 internal combustion engine of the same displacement.

10. Engine control module as in claim 9, wherein:

a. said injector fueling maps provide data to said PCM to selectively control the triggering of pulse duration of individual cylinder fuel injectors of said engine EF system so that four individual cylinders of said twelve cylinders are sequentially fueled, the remaining eight cylinders are grouped into a set of four cylinder pairs, and each of said pairs of cylinders are simultaneously fueled, said four pairs in said set being sequentially fueled, so that in 720° of rotation of said crankshaft, all 12 cylinders are fueled; and b. said ignition maps provide data to said PCM to selectively control the triggering of firing of individual cylinders by said DIS system so that said four sequentially fueled individual cylinders are sequentially fired, and each pair of said set of four pairs of simultaneously fueled cylinders are simultaneously fired in sequence.

11. Engine control module as in claim 10, wherein said engine exhibits an Imbalance Frequency Range (IFR) of RPMs, and said maps provide data to said PCM to control the fueling of one cylinder of each pair of cylinders in said set to be lean in said IFR, thereby to minimize the vibrations produced by said imbalance.

12. Engine control module as in claim 9, wherein in said IFR, said maps provide data to said PCM to trigger ignition in said lean fueled cylinder of each pair in said set simultaneously with ignition of said fully fueled cylinder of said pair so that they fire simultaneously, said firing of said lean fueled cylinder assisting in igniting residual unburned hydrocarbons in said cylinder, thereby minimizing emissions generation.

13. Method of operation of a V12 reciprocating internal combustion engine having an Electronic Fuel Injection (EFI) system, a Distributorless Ignition System (DIS) and a Powertrain Control Module (PCM) having fuel injector pulse and ignition map data structures for fueling and firing of the cylinders of said engine by said EFI and DIS systems, comprising the steps of:

a. selectively controlling the triggering of pulse duration of individual cylinder fuel injectors of said engine EFI system so that four individual cylinders of said twelve cylinders are sequentially fueled, the remaining eight cylinders are grouped into a set of four cylinder pairs, and each of said pairs of cylinders are simultaneously fueled, said four pairs in said set being sequentially fueled, so that in 720° of rotation of said crankshaft, all 12 cylinders are fueled;

b. selectively controlling the triggering of firing of individual cylinders by said DIS system so that said four sequentially fueled individual cylinders are sequentially fired, and each pair of said set of four pairs of simultaneously fueled cylinders are simultaneously fired in sequence so that in 720° of rotation of said crankshaft, all 12 cylinders are fired; and c. controlling said cylinder firing with respect to the location of pistons in said cylinders to result in an even fired, progressive single/pair fueled and fired 90°V12 internal combustion engine having more torque and power output than an odd fired 90°V12 internal combustion engine of the same displacement.

14. Method of operation of a V12 reciprocating internal combustion engine as in claim 13 wherein said engine exhibits an Imbalance Frequency Range (IFR) of RPMs, and which includes the added step of controlling the fueling of one cylinder of each pair of cylinders in said set to be lean in said IFR, thereby to minimize the vibrations produced by said imbalance.

15. Method of operation of a V12 reciprocating internal combustion engine as in claim 14 wherein said step of controlling fueling in said IFR includes lean fueling said cylinder of each pair simultaneously with full fueling of the other cylinder of each pair, said full fueling including compensation by said PCM for at least one of engine speed, manifold absolute pressure and throttle position.

16. Method of operation of a V12 reciprocating internal combustion engine as in claim 15 which includes the step in said IFR of igniting said lean fueled cylinder of each pair in said set simultaneously with ignition of said full fueled cylinder of said pair so that they fire simultaneously, said firing of said lean fueled cylinder assisting in igniting residual unburned hydrocarbons in said cylinder, thereby minimizing emissions generation.

17. Method of operation of a V12 reciprocating internal combustion engine as in claim 13 which includes the added step of dynamically balancing the amount of fuel injected into each cylinder throughout at least a portion of the operating RPM range of said engine under a wide range of loads, by providing to said PCM input signals from at least one of an Exhaust Gas Temperature (EGT) and an Exhaust Gas O2 (EGO) sensor to modify the amount of fuel provided to said cylinders in response to engine speed and load in a feedback loop, thereby resulting in improvements in longer engine life, better power output, improved fuel economy and lower pollution.

18. Method of operation of a V12 reciprocating internal combustion engine as in claim 13 wherein the cylinders adjacent each end of said engine are denominated exterior cylinders, and the remaining cylinders between end, exterior cylinders are denominated interior cylinders, and which includes the added step of controlling fueling and firing so that the interior cylinders comprise the set of four cylinder pairs.

19. Method of operation of a V12 reciprocating internal combustion engine as in claim 18 wherein said engine comprises two banks of cylinders consisting of a first, A, bank having cylinders denominated with odd numbers 1, 3, 5, 7, 9 and 11, and a second, B, bank having cylinders denominated with even numbers 2, 4, 6, 8, 10 and 12, said cylinder numbers 1, 2, 11 and 12 are said external cylinders, and which includes the step of fueling and firing said cylinders in the number order 1, 12, 11, 2, 6/10, 5/9, 4/8 and 3/7.

20. Method of operation of a V12 reciprocating internal combustion engine as in claim 16 wherein said step of lean fueling one cylinder of each pair of cylinders in said set and of fully fueling the other cylinder of each pair of cylinders in said set includes the added step of alternately lean fueling and fully fueling the cylinders of each pair in said step.

* * * * *